(12) United States Patent
Stone

(10) Patent No.: US 10,895,133 B2
(45) Date of Patent: Jan. 19, 2021

(54) WET GAS CONDENSER

(71) Applicant: GE OIL & GAS UK LIMITED, Bristol (GB)

(72) Inventor: Matthew Edmund Stone, Bristol (GB)

(73) Assignee: GE Oil & Gas UK Limited, Bristol (GB)

( * ) Notice: Subject to any disclaimer, the term of this patent is extended or adjusted under 35 U.S.C. 154(b) by 0 days.

(21) Appl. No.: 16/088,901

(22) PCT Filed: Apr. 5, 2017

(86) PCT No.: PCT/EP2017/058143
§ 371 (c)(1),
(2) Date: Sep. 27, 2018

(87) PCT Pub. No.: WO2017/178305
PCT Pub. Date: Oct. 19, 2017

(65) Prior Publication Data
US 2019/0112899 A1 Apr. 18, 2019

(30) Foreign Application Priority Data

Apr. 14, 2016 (GB) .................................. 1606552.6

(51) Int. Cl.
*E21B 43/01* (2006.01)
*B01D 53/26* (2006.01)
*F28F 3/02* (2006.01)
*F28C 3/00* (2006.01)
*E21B 43/34* (2006.01)
(Continued)

(52) U.S. Cl.
CPC ............ *E21B 43/01* (2013.01); *B01D 53/002* (2013.01); *B01D 53/265* (2013.01); *E21B 43/34* (2013.01); *F28C 3/005* (2013.01); *F28F 3/02* (2013.01); *E21B 43/36* (2013.01)

(58) Field of Classification Search
CPC ..... B01D 53/002; B01D 53/265; E21B 43/01; E21B 43/34; E21B 43/36; E21B 43/38; F28C 3/005; F28F 3/02
See application file for complete search history.

(56) References Cited

U.S. PATENT DOCUMENTS

| 6,774,276 | B1 | 8/2004 | Lund et al. |
| 2002/0120172 | A1 | 8/2002 | Waycuilis et al. |

(Continued)

FOREIGN PATENT DOCUMENTS

WO 2005/031116 A2 4/2005

OTHER PUBLICATIONS

Search Report issued in connection with corresponding GB Application No. 1606552.6 dated Oct. 18, 2016.
(Continued)

*Primary Examiner* — James G Sayre
(74) *Attorney, Agent, or Firm* — Baker Hughes Patent Organization

(57) ABSTRACT

A gas production line including: an inlet; an outlet; and a wet gas condenser connected between the inlet and the outlet, wherein the wet gas condenser includes: a condensing chamber; a condensing surface; and a collecting chamber, wherein, in use, water vapour in wet gas passing over the condensing surface is condensed into liquid water, the liquid water flowing along a predetermined flow path into the collecting chamber.

20 Claims, 1 Drawing Sheet

(51) Int. Cl.
  *B01D 53/00* (2006.01)
  *E21B 43/36* (2006.01)

(56) References Cited

U.S. PATENT DOCUMENTS

| | | |
|---|---|---|
| 2004/0144545 A1 | 7/2004 | Lauritzen et al. |
| 2005/0072301 A1* | 4/2005 | Baciu ................... B01D 53/002 |
| | | 95/258 |
| 2005/0274515 A1 | 12/2005 | Smith et al. |
| 2010/0147056 A1 | 6/2010 | Stolle et al. |
| 2010/0242732 A1* | 9/2010 | Saville ................. B01D 53/265 |
| | | 95/272 |

OTHER PUBLICATIONS

International Search Report and Written Opinion issued in connection with corresponding PCT Application No. PCT/EP2017/058143 dated Jun. 20, 2017.

International Preliminary Report on Patentability issued in connection with corresponding PCT Application No. PCT/EP2017/058143 dated Oct. 16, 2018.

\* cited by examiner

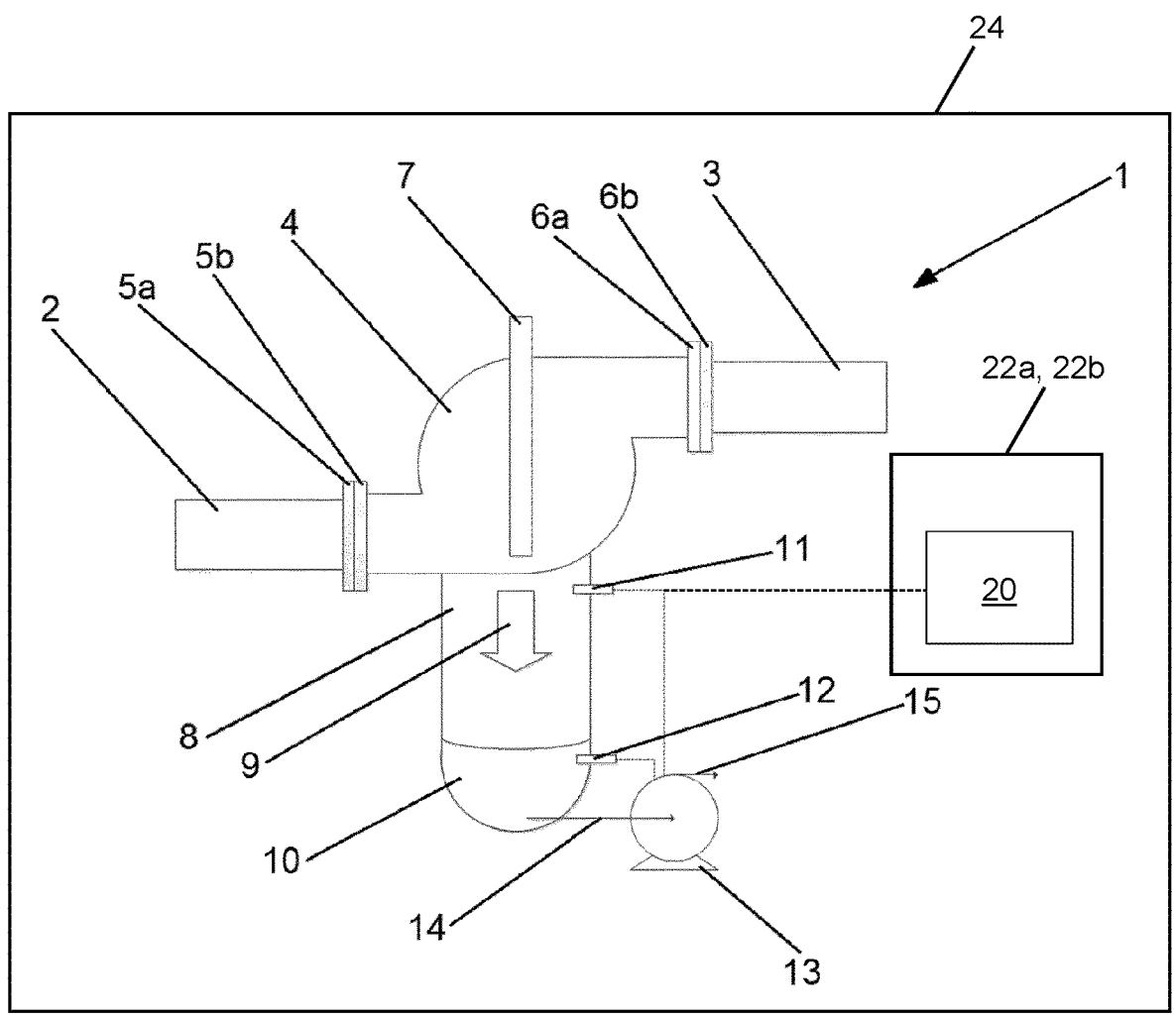

WET GAS CONDENSER

FIELD OF INVENTION

Embodiments of the invention relate to a gas production line including a wet gas condenser, for example in a subsea hydrocarbon extraction facility. Embodiments of the invention also relate to a method of removing water vapour from a wet gas flow in a gas production line.

In the following specification the term 'wet gas' is intended to mean a gas comprising water vapour.

BACKGROUND OF THE INVENTION

In gas production lines, for example in subsea hydrocarbon extraction facilities, hot gases may be passed through pipelines in relatively cool ambient environments. It these gasses contain water vapour the temperature difference may cause said vapour to condense into liquid form inside the pipeline. A large build-up of this liquid water can result in the formation of a so-called water plug, which can obstruct the passage of gas through the production line.

In the prior art, the problem of water plugs in subsea pipelines has been overcome through intervention, typically by a remotely operated underwater vehicle (ROV), to drain the liquid water from the pipeline and remove the plug. This solution is generally undesirable, as it is time consuming and costly to perform any kind of subsea intervention.

Embodiments of the present invention aim to overcome some of the problems associated with prior art gas production lines.

As prior art there may be mentioned WO2000040835, which discloses a method of accelerating a gas flow to lower its temperature and pressure to below the condensation point of some of its heavier gaseous components, U.S. Pat. No. 6,703,534, which discloses a subsea heat exchanger, U.S. Pat. No. 9,068,451, which discloses a method of separating hydrocarbons in a fluid flow, U.S. Pat. No. 8,978,769, which discloses an offshore hydrocarbon cooling system, U.S. Pat. No. 5,442,924, which discloses a method of removing condensates from a natural gas flow through filtration, and "Selective Removal of Water From Supercritical Natural Gas" by Anahid Karimi et al (accessible at https://www.onepetro.org/conference-paper/SPE-100442-MS), which discloses a simulation model to predict the efficiency of the removal of water from a hydrocarbon flow under various flow conditions.

SUMMARY OF INVENTION

According to embodiments of the present invention from one aspect, there is provided a gas production line comprising:
  an inlet;
  an outlet; and
  a wet gas condenser connected between the inlet and the outlet, wherein the wet gas condenser comprises:
    a condensing chamber;
    a condensing surface; and
    a collecting chamber,
  wherein, in use, water vapour in wet gas passing over the condensing surface is condensed into liquid water,
  said liquid water flowing along a predetermined flow path into the collecting chamber.

According to embodiments of the the present invention from a second aspect, there is provided a method of removing water vapour from a wet gas flow in a gas production line, the method comprising:
  providing a wet gas condenser comprising a condensing chamber, a condensing surface and a collecting chamber;
  connecting an inlet of the gas production line to the wet gas condenser;
  connecting an outlet of the gas production line to the wet gas condenser; and
  arranging the wet gas condenser such that water vapour in wet gas passing over the condensing surface is condensed into liquid water, said liquid water flowing along a predetermined flow path into the collecting chamber.

The predetermined flow path could be defined by the influence of gravity, or a predicted migration path under the influence of the gas flow.

The condensing surface could extend through a wall of the condensing chamber to be in thermal contact with the environment outside the condensing chamber.

The condenser could comprise a pump operable to pump water from the collecting chamber to a further location. The condenser could comprise a water sensor attached to a wall of the collecting chamber. The water sensor could be in communication with control circuitry to activate and deactivate the pump. The control circuitry could be configured to activate the pump when the water sensor detects the presence of water in its proximate area. The condenser could comprise a second water sensor attached to a wall of the collecting chamber. The second water sensor could be in communication with the control circuitry. The control circuitry could be configured to deactivate the pump when the second water sensor detects the absence of water in its proximate area.

The control circuitry could be located in a subsea electronics module or in a topside control station.

According to embodiments of the present invention from a third aspect, there is provided a hydrocarbon extraction facility including a gas production line as defined above.

BRIEF DESCRIPTION OF THE DRAWING

FIG. 1 schematically shows a gas production line.

DETAILED DESCRIPTION

FIG. 1 shows a gas production line 1. A flow of gas flows from an inlet 2 to an outlet 3. The inlet may be connected to a subsea hydrocarbon well. The outlet may be connected to a riser for transmitting the gas flow to a surface location.

The gas production line 1 comprises a condensing chamber 4 connected between the inlet 2 and the outlet 3. The inlet comprises a flanged connector 5a which is connected to a cooperating flanged connector 5b on the condensing chamber 4. The condensing chamber 4 comprises a further flanged connector 6a which is connected to a cooperating flanged connector 6b on the outlet 3.

The condensing chamber 4 comprises a condensing surface 7. As can be seen in FIG. 1, the condensing surface 7 extends through a wall of the condensing chamber 4. This allows the temperature of the ambient environment outside the condensing chamber, i.e. the subsea ambient environment, to be in thermal contact with the condensing surface 7. As the ambient environment is typically cooler than the temperature of the gas flow in the gas production line, this enhances the effectiveness of the condensing surface 7.

The condensing surface 7 could take any suitable form. In general, desirable attributes are:
i) large surface area presented to gas flow—for example, a network of thin fins, wires or filaments;

ii) not obtrusive to gas flow—for example, a large number of apertures to allow high velocity gas to pass through the surface; and iii) provides a predetermined flow path for condensed moisture—for example, a wick, or multiple wicks, to guide water droplets towards the condensing chamber in a predictable, predetermined flow path, either under the influence or gravity, under the influence of the gas flow, or under the influence of both.

The condensing surface should also be constructed to avoid the collection of debris from the gas flow. For example, a low-friction coating could be applied to the condensing surface. Additionally or alternatively, the condensing surface could have one or more redundant surface to deflect debris that would otherwise collect in an aperture of the condensing surface.

If the flow of gas in the gas production line 1 contains moisture in vapour form, this will condense on the condensing surface 7. From here, the condensed moisture will flow down under gravity, as indicated by arrow 9, into a collecting chamber 8. Collected water accumulates at the bottom of the collecting chamber 8 as indicated by reference numeral 10.

A pair of sensors are connected to the collecting chamber 8: a 'start' sensor 11 and a 'stop' sensor 12. The sensors are connected to a wall of the collecting chamber 8 and are operable to sense the presence of liquid water in the area proximate the sensor. Exemplary sensors include conducive resistance probes, acoustic detectors, mass detectors and proximity proves such as infrared (IR) beam emitters and detectors.

Both sensors are in communication with a processor which contains control circuitry 20 to operate a pump 13. Said control circuitry 20 could be located subsea, for example in a subsea electronics module (SEM) 22*a*, or at a topside location, for example in a topside control station (TCS) 22*b*, said communication taking place via communication lines in an umbilical. The gas production line 1 may be used in a hydrocarbon extraction facility.

The control circuitry operates on the following logic: once the 'start' sensor 11 detects that water has reached a maximum level at the top of the collecting chamber 8, the pump 13 is instructed to pump water out of the bottom of the collecting chamber. The arrow 14 represents the movement of water out of the bottom of the collecting chamber 8 to the pump 13, and arrow 15 represents the movement of water from the pump 13 to a further location, e.g. the ambient subsea environment, a return line, a fluid re-injection line, or a waste disposal system. Once the 'stop' sensor 12 no longer senses the presence of water in its proximate area, the water has fallen to an acceptably low level and so the pump 13 is instructed to stop pumping water from the bottom of the collecting chamber 8.

The processor could also comprise a data storage to log the frequency with which the collecting chamber 8 is emptied. The stored data could be used to infer changes in the composition of the gas flow in the gas line (e.g. water vapour content) over time. The inferred change in gas flow composition can be used as part of a wider well management strategy. For example, if the data shows that the water build-up rate is increasing, this may mean that there is a higher hydrate risk. Corrective action could then be taken, such as decreasing the pressure in the well.

While embodiments of the invention have been described above with respect to a vertical condensing surface, this is exemplary only and embodiments of the invention are not so limited. For example, while the condensing surface 7 is shown as being vertical in FIG. 1, the condensing surface could be angled, and condensed moisture could flow along a predicted migration path along the condensing surface under the influence of the gas flow. Such an arrangement can have the benefit that a larger total surface area is presented to the gas flow, compared to a condensing surface that is perpendicular to the gas flow, and so a larger volume of moisture can be condensed.

Another benefit is that an angled condensing surface will generally introduce less turbulence into the gas flow, as the flow of gas will be deflected less by an angled condensing surface compared to a perpendicular condensing surface.

Another modification is that embodiments of the invention may form part of a water injection system for an underwater hydrocarbon extraction facility. The condensed water may be used in place of water inserted from the surface. This can act to reduce the amount of water that is required to be inserted for the surface, or replace such water entirely, meaning that costly topside water injection systems can be removed completely in some cases.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas production line comprising:
   an inlet;
   an outlet; and
   a wet gas condenser connected between the inlet and the outlet, wherein the wet gas condenser comprises:
      a pump;
      a condensing chamber;
      a condensing surface;
      a collecting chamber; and
      a water sensor attached to a wall of the collecting chamber,
      wherein the water sensor is in communication with control circuitry to activate and deactivate the pump,
      wherein, in use, water vapour in wet gas passing over the condensing surface is condensed into liquid water,
      the liquid water flowing along a predetermined flow path into the collecting chamber.

2. The gas production line according to claim 1, wherein the condensing surface extends through a wall of the condensing chamber to be in thermal contact with the environment outside the condensing chamber.

3. The gas production line according to claim 1, wherein the pump is operable to pump water from the collecting chamber to a further location.

4. The gas production line according to claim 1, wherein the control circuitry is configured to activate the pump when the water sensor detects the presence of water in its proximate area.

5. The gas production line according to claim 4, wherein the condenser comprises a second water sensor attached to a wall of the collecting chamber.

6. The gas production line according to claim 5, wherein the second water sensor is in communication with the control circuitry.

7. The gas production line according to claim 6, wherein the control circuitry is configured to deactivate the pump when the second water sensor detects the absence of water in its proximate area.

8. The gas production line according to claim 1, wherein the control circuitry is located in a subsea electronics module.

9. The gas production line according claim 1, wherein the control circuitry is located in a topside control station.

10. The gas production line according to claim 1, wherein the gas production line is used in a hydrocarbon extraction facility.

11. A method of removing water vapour from a wet gas flow in a gas production line, the method comprising:
providing a wet gas condenser comprising a pump, a condensing chamber, a condensing surface, a collecting chamber, and a water sensor attached to a wall of the collecting chamber, wherein the water sensor is in communication with control circuitry to activate and deactivate the pump;
connecting an inlet of the gas production line to the wet gas condenser;
connecting an outlet of the gas production line to the wet gas condenser; and
arranging the wet gas condenser such that water vapour in wet gas passing over the condensing surface is condensed into liquid water, the liquid water flowing along a predetermined flow path into the collecting chamber.

12. The method according to claim 11, wherein the condensing surface extends through a wall of the condensing chamber to be in thermal contact with the environment outside the condensing chamber.

13. The method according to claim 11, wherein the pump is operable to pump water from the collecting chamber to a further location.

14. The method according to claim 11, wherein the control circuitry is configured to activate the pump when the water sensor detects the presence of water in its proximate area.

15. The method according to claim 14, wherein the condenser comprises a second water sensor attached to a wall of the collecting chamber.

16. The method according to claim 15, wherein the second water sensor is in communication with the control circuitry.

17. The method according to claim 16, wherein the control circuitry is configured to deactivate the pump when the second water sensor detects the absence of water in its proximate area.

18. The method according to claim 11, wherein the control circuitry is located in a subsea electronics module.

19. The method according to claim 11, wherein the control circuitry is located in a topside control station.

20. The method according to claim 11 performed in an underwater hydrocarbon extraction facility.

* * * * *